(12) United States Patent
Wilson

(10) Patent No.: US 6,816,959 B2
(45) Date of Patent: Nov. 9, 2004

(54) MEMORY ACCESS SYSTEM

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/694,996

(22) Filed: Oct. 29, 2003

(65) Prior Publication Data
US 2004/0088518 A1 May 6, 2004

Related U.S. Application Data

(63) Continuation of application No. 09/395,295, filed on Sep. 13, 1999, now Pat. No. 6,662,292.

(30) Foreign Application Priority Data
Jul. 14, 1999 (GB) .............................................. 9916564

(51) Int. Cl.$^7$ ................................................ G06F 12/00
(52) U.S. Cl. ....................................... 711/220; 711/215
(58) Field of Search ................................ 711/220, 215; 712/224, 225, 211

(56) References Cited

U.S. PATENT DOCUMENTS

| 5,924,128 A | 7/1999 | Luick et al. |
| 6,145,077 A | 11/2000 | Sidwell et al. |
| 6,260,137 B1 | 7/2001 | Fleck et al. |

FOREIGN PATENT DOCUMENTS

| DE | 40 19 961 A1 | 1/1991 |
| EP | 0 047 439 | 3/1982 |
| EP | 0 227 900 | 7/1987 |

Primary Examiner—Jack Lane
(74) Attorney, Agent, or Firm—Sterne, Kessler, Goldstein & Fox, PLLC

(57) ABSTRACT

A memory access system is described which generates two memory addresses from a single memory access instruction which identifies a register holding at least two packed objects. In the preferred embodiment, the contents of a base register is combined respectively with each of two or more packed objects in an offset register.

16 Claims, 5 Drawing Sheets

MEMORY ACCESS SYSTEM

CROSS-REFERENCE TO RELATED APPLICATIONS

This application is a continuation of U.S. patent application No. 09/395,295; filed Sep. 13, 1999, now U.S. Pat. No. 6,662,292 which claims priority to Great Britain Patent Application No. 9916564.9, flied Jul. 14, 1999.

FIELD OF THE INVENTION

The present invention relates to a memory access system particularly but not exclusively designed to facilitate memory accesses in a processor. The invention also relates to a method of generating memory addresses and for accessing memory, to a computer system and a computer program product.

BACKGROUND TO THE INVENTION

Existing computer systems generally operate by generating memory addresses for accessing memory sequentially. That is the architecture of existing computer systems is arranged such that each memory access instruction defines a single memory address. Memory access units exist which allow two addresses to be generated from a single instruction, by automatically incrementing the address defined in the instruction by a certain predetermined amount. However, these systems are clearly restricted in that, if two addresses are generated, the second address necessarily bears a certain predetermined relationship to the first address. Vector stride units also exist which allow more than one memory address to be computed, but these are also limited in the relationship between the addresses. Moreover, it is necessary to generate the first address prior to calculating the second address and therefore it is not possible to generate two memory access addresses simultaneously in a single memory access unit.

It is an object of the present invention to provide increased flexibility for memory accesses.

SUMMARY OF THE INVENTION

According to one aspect of the invention there is provided a memory access system comprising: a register file having a plurality of registers each having the same predetermined bit capacity and capable of holding one or more objects depending on the bit length of the object, said registers including at least a first address register holding at least two packed objects for use in identifying respective memory addresses; a register accessing circuit operative responsive to a memory access instruction to access said first address register in said register file; address generating circuitry for generating at least first and second memory addresses from said at least two packed objects; and memory access circuitry for accessing a memory using said first and second addresses.

In the embodiment described herein, the first address register is an index register, said at least two packed objects being offset objects. The second register holds the base value which, when combined with the packed objects, generates said first and second addresses.

A number of alternatives are possible. According to one alternative, the base value can itself comprise two packed objects which, when combined respectively with the two packed offset objects generate respective first and second addresses.

In another arrangement, the base value can comprise two packed objects, while the index register holds a single offset value which, when added to the respective packed base value objects generate said first and second memory addresses.

The address generating circuitry can comprise first and second addition circuits for respectively adding the packed objects in the first register with the contents of the second register to generate said first and second addresses.

The present invention also provides a computer system comprising: a memory holding data objects; a memory access unit for accessing said memory to retrieve data objects; a decode unit for decoding instructions for use in controlling said memory access unit; and a register file having a plurality of registers each having the same predetermined bit capacity and capable of holding one or more objects depending on the bit length of the objects; said registers including at least a first address register holding at least two packed objects for use in identifying respective memory addresses; wherein the memory access unit is responsive to a memory access instruction defining said first address register to access said first address register in said register file and to generate at least first and second memory addresses from said at least two packed objects, said addresses being used to access said memory.

The length of the object to be retrieved from the memory can be defined in the memory access instruction.

The computer system can contain a second memory access unit which can itself generate two addresses from certain memory access instructions. However, if the second memory access unit is idle and two addresses have been generated by the first memory access unit, the second memory access unit can receive one of the addresses and use this so that two simultaneous accesses to memory can be made.

The invention also provides a method of generating addresses for accessing a data memory, the method comprising: retrieving from a base register a base value representing at least one base address; retrieving from an index register at least one index value; wherein at least one of the base value and the index value comprises at least two packed objects; combining the base value and the index value to generate at least first and second addresses for accessing said memory; wherein said base register and index register are defined in a single computer instruction.

Another aspect of the invention provides a method of accessing a memory holding data values, the method comprising: reading a memory access instruction which identifies at least a first address register holding at least two packed objects for use in identifying respective memory addresses; simultaneously generating at least first and second memory access addresses from said at least two packed objects; and using said first and second memory access addresses to access said memory.

A still further aspect of the invention provides a computer program product comprising program code means capable of cooperating with a computer when loaded therein to effect memory accesses, said program code means including a memory access instruction which identifies at least a first address register holding at least two packed objects for use in identifying respective memory addresses such that said first and second memory addresses are simultaneously generated by a computer on which the computer program product runs.

For a better understanding of the present invention and to show how the same may be carried into effect, reference will now be made by way of example to the accompanying drawings.

DESCRIPTION OF THE PREFERRED EMBODIMENT

Figure 1:
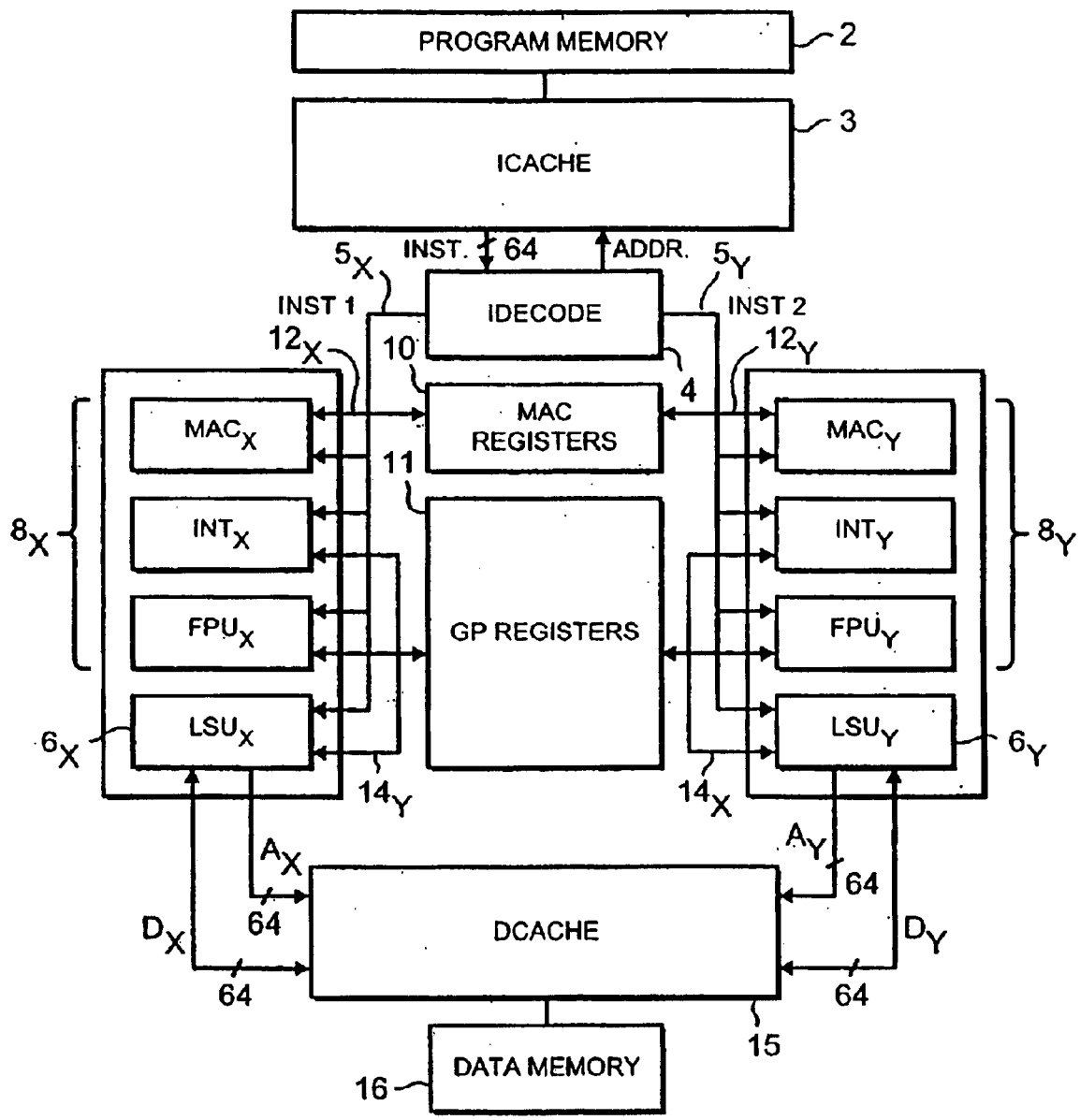
FIG. 1 is a schematic block diagram illustrating a processor.
Figure 2:
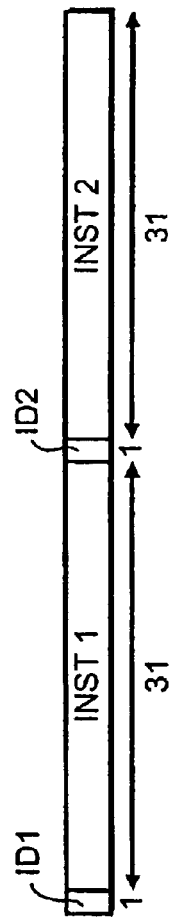
FIG. 2 is a diagram illustrating the encoding of two "packed" instructions.
Figure 3:
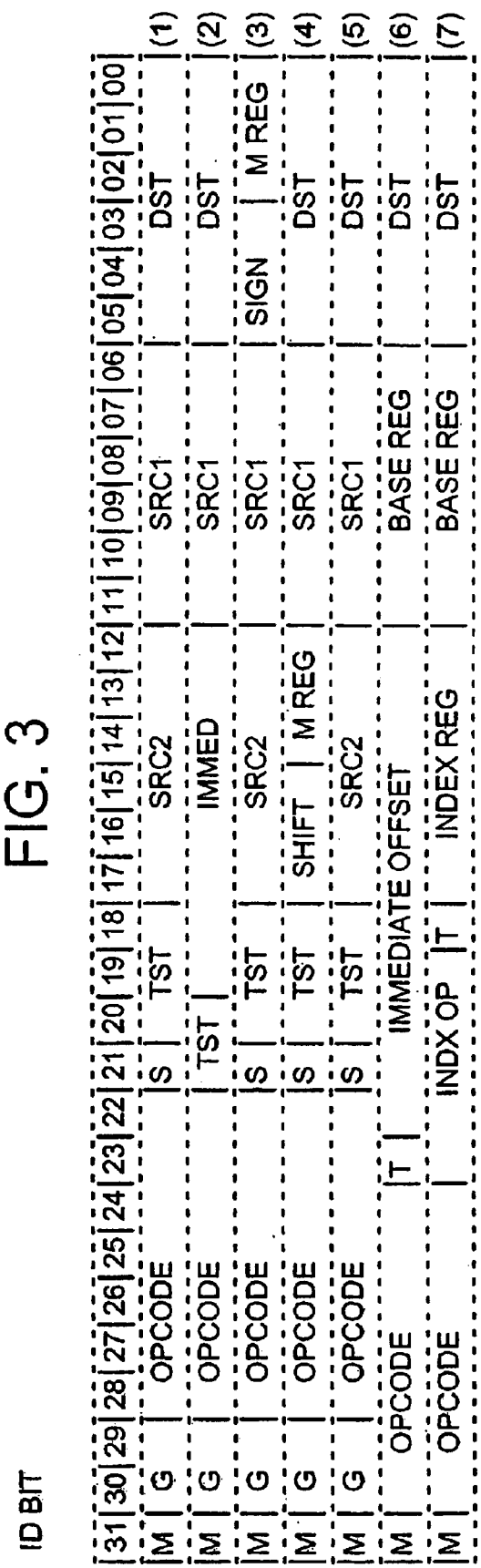
FIG. 3 illustrates a number of different instruction formats.

The computer system described herein is a dual instruction stream, multiple data (DIMD) stream machine which normally executes two "instructions" every cycle. FIG. 1 is a schematic diagram of the system. In FIG. 1, reference numeral 2 denotes a program memory which holds programs in the form of a plurality of instructions. In the normal mode of operation, each 64 bit instruction in the program memory allows two 31 bit operations to be defined in the manner illustrated in FIG. 2. That is, each 64 bit instruction contains two 31 bit instruction portions labelled INST1 and INST2. Each instruction portion has associated with it a single bit which identifies the type of instruction. These are denoted ID1 and ID2 in FIG. 2, standing for identification bits. An instruction portion can identify a data processing (DP) operation or a load/store (LD/ST) operation as will be explained more fully hereinafter. The allowed combinations are two data processing operations (ID1,ID2 both set to "0"), two load/store operations (ID1,ID2 both set to "1") or one data processing and one load store operation (ID1=0, ID2=1). FIG. 3 illustrates some of the basic instruction formats for the 31 bit instruction portions, with M denoting the identification bit. In the following, the word "instruction" is used to denote the 32 bit sequence M plus the instruction portion because they are treated as instructions by each side of the DIMD machine.

Reverting to FIG. 1, the program memory 2 is connected as instruction cache 3 which is connected to instruction fetch/decode circuitry 4. The fetch/decode circuitry issues addresses to the program memory and receives 64 bit lines from the program memory 2 (or cache 3), evaluates the opcode and transmits the respective instructions INST1, INST2 along X and Y channels $5_x,5_y$. Each channel comprises a SIMD execution unit $8_x,8_y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

| | |
|---|---|
| (B) | 8 bit objects ($b_0 \ldots b_7$) |
| (H) | 16 bit objects ($h_0 \ldots h_3$) |
| (W) | 32 bit objects ($w_0 \ldots w_1$) |
| (L) | 64 bit objects (l) |
| (S) | 32 bit floating point |
| (D) | 64 bit floating point |

For each channel $5_x,5_y$ if the instruction is a data processing instruction it is supplied to the appropriate data processing unit MAC, INT or FPU and if it is a load/store instruction it is supplied to the load/store unit LSU. Data values are loaded to and from the MAC data processing units into and out of a common register file 10 which includes sixteen 64 bit special purpose registers along register access paths $12_x,12_y$. Data values are loaded to and from the INT and FPU data processing units and the load/store units LSU into and out of a second register file 11 which includes sixty-four 64-bit general purpose registers. Register access paths $14_x$, $14_y$ are provided for these accesses. The program counter PC which indicates the current instruction can be read via one of the general purpose registers. Another one of the general purpose registers constitutes a control and status register.

Each register access path 12,14 carries three addresses from the accessing unit, two source addresses SRC1,SRC2 and a destination address DST. In the case of data processing instructions, the source addresses SRC1,SRC2 define registers in the register files 10,11 which hold source operands for processing by the data processing unit. The destination address DST identifies a destination register into which a result of data processing will be placed. See instruction formats (1) to (5) in FIG. 3. The operands and results are conveyed between the register file 10 or 11 and the respective data processing unit via the access paths 12,14. In the case of load/store instructions, the instruction formats allow memory access addresses $Ax,A_y$ to be formulated from data values held in the registers as described later. The load store units access a common address space in the form of a data memory 16 via a dual ported data cache DCACHE 15. For this purpose, each load/store unit has a 64 bit data bus Dx,Dy and a 64 bit address bus Ax,Ay. Each load/store unit $6_x,6_y$ can execute a number of different memory access (load/store) instructions, implemented in formats (6) and (7) in FIG. 3.

According to a first class of memory access instructions, an object is loaded into a destination register specified in the instruction (in the DST field) from an address read from a source register in the instruction (in the BASE REG field). The length of the object depends on the SIMD lane B,H,W or L specified in the instruction opcode. If the object length is less than 64 bits, the upper bits of the destination register are filled with zeros. This class of instruction also allows the number of objects to be specified. The memory address is read from the source register in the register file 11 by the specified load/store unit $6_x,6_y$ and despatched to the cache 15 via the appropriate address bus $A_x,A_y$ The object or objects are returned along the data bus Dx or Dy and loaded into the destination register of the register file 10 by the load/store unit. As is well known, on a cache miss, an access to the data memory 16 may be needed.

For each of the load instructions in the first class, there are matching store instructions. In each case, a single address is sent by each load/store unit and a single data value is returned at that address. That data value can constitute a number of objects depending on the number specified in the instruction and the length specified in the SIMD lane of the instruction.

The processor described herein additionally provides a new class of instructions which use packed offsets with a single base register in order to compute two (or more) addresses from a single instruction and therefore allow two (or more) data values to be retrieved from memory from one 32 bit instruction. The destination register (which serves as a source register for store operations) specifies an even/odd pair of registers for the memory access. Format (7) illustrated in FIG. 3 is used for this class of memory access instructions. By way of example, one instruction in this class, LDL2, will be described.

The load instruction LDL2 allows two long words to be loaded into successive destination registers $r_b,r_b+1$ from two independent addresses ADDR1,ADDR2 derived from a base address held in a register $r_a$ identified in the BASE REG field and two packed offsets w0,w1 held in a register $r_c$ identified in the INDX REG field. The LDL2 instruction thus allows two independent addresses to be generated. The INDX OP field allows the degree of packing (SIMD lane) in the index register $r_c$ to be defined.

Figure 4:
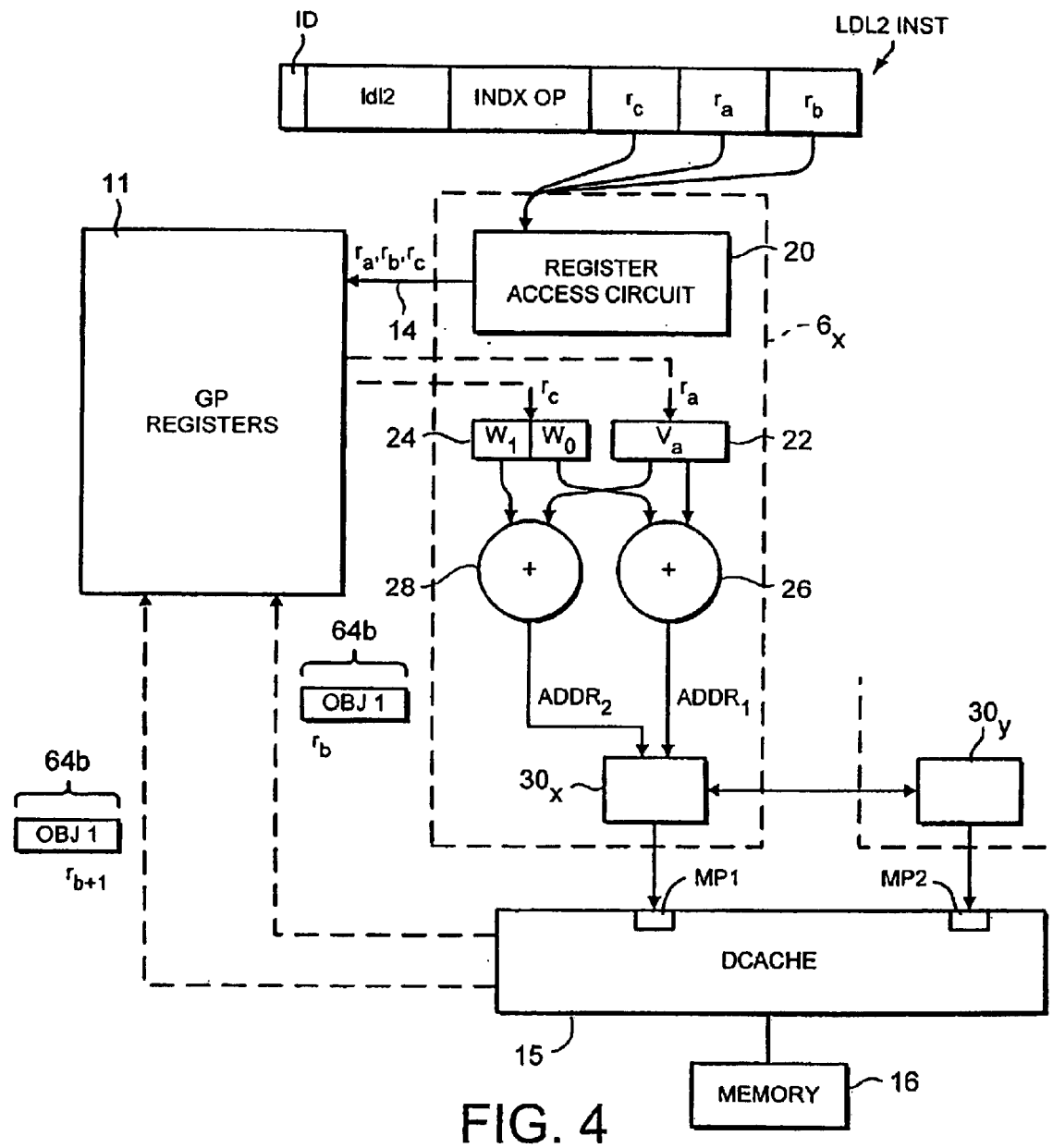
FIG. 4 is a diagram illustrating operation of the memory access unit.

FIG. 4 illustrates operation of the LDL2 instruction. The instruction itself is illustrated at the top of FIG. 4 identifying a destination register $r_b$, a base register $r_a$ and an index register $r_c$. The opcode of the instruction defines the instruction as an LDL2 instruction and the INDX OP field identifies the packing of the index register $r_c$. In this case, the packing is two 32 bit words w0,w1. The value in the base register field is denoted $V_a$ and constitutes the base address.

One load store unit which may be $6_x$ or $6_y$ is fully illustrated in FIG. 4. It comprises a register access circuit 20 and buffers 22,24 for temporarily holding the values received from the base register $r_a$ and index register $r_c$. In addition there are two addition circuits 26,28, and a memory access circuit $30_x$.

The register access circuit 20 allows the general purpose register file 11 to be accessed. When the instruction is received, the base register $r_a$ and index register $r_c$ are addressed and they return their respective values $V_a$, w0;w1 to the temporary buffers 22,24 respectively. The first addition circuit 26 adds the value $V_a$ to the first word w0 in the index register $r_c$ and the second addition circuit 28 adds the base value $V_a$ to the second word w1 in the index register $r_c$. In this way, two address ADDR1 and ADDR2 are generated to the cache 15. Then, the destination registers $r_b,r_b+1$ are addressed by the register access circuit 20. In this case, the register address $r_b$ addresses an even or odd pair of registers. The retrieved 64 bit objects OBJ1,OBJ2 from memory are thus supplied to the general purpose register file 11 in the destination registers $r_b,r_b+1$ respectively.

An advantage of having packed offsets w0,w1 in the index register $r_c$ is that a single packed operation, e.g. addw, can simultaneously update both offsets (and thus both addresses) by the same amount.

Although only one of the load/store units is fully illustrated in FIG. 4, it will be appreciated that the other load/store unit acts in the same way.

Figure 5A:
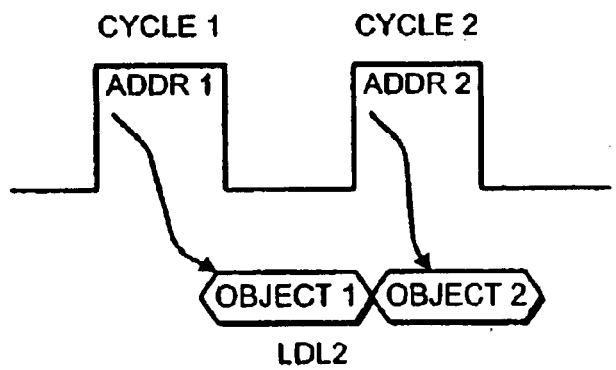
FIGS. 5a and 5b illustrate the timing of different memory access operations.
Figure 5B:
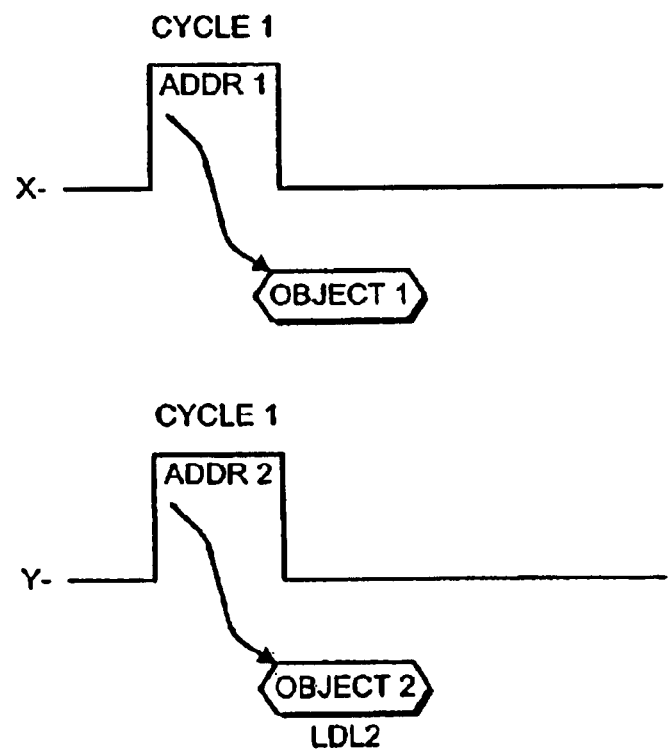

Each load/store unit 6 comprises a memory access circuit 30 which receives the addresses ADDR1,ADDR2 and can supply them to the cache 15 in successive memory access cycles as illustrated in FIG. 5a. The arrangement of the processor is such that the cache 15 has two access ports MP1,MP2. The X channel communicates via access port MP1. The Y channel communications via access port MP2. The memory access circuits $30_x,30_y$ of each of the X and Y channels can communicate with one another so that, if the Y channel memory access circuit is inactive, but two addresses have been generated from a single instruction by the X channel load/store unit $6_x$, then the memory access circuit of the Y channel $30_y$ can receive the second address ADDR2 from the X channel so that both addresses ADDR1,ADDR2 can be supplied to the cache 15 in the same memory access cycle. This is illustrated in FIG. 5b.

This can occur, for example, if of the two instructions fetched in each machine cycle, one instruction is a data processing instruction while the other instruction is a load/store instruction. In that case, one load/store unit may not be active while the other load/store unit is. By way of example, if an LDL2 instruction is received by the load/store unit LSU $6_x$ in the X channel, two addresses ADDR1 and ADDR2 are generated. ADDR1 is fed to the address generator $30_x$ while the X channel LSU $6_x$ determines whether or not the Y channel load/store unit LSU $6_y$ is busy. If the Y channel LSU $6_y$ is not busy, the second address ADDR2 is conveyed to the access unit $30_y$ of the Y channel load/store unit LSU $6_y$. Then, in one machine cycle, both ADDR1 and ADDR2 are issued to the data memory 16 at the respective ports MP1, MP2. If however the Y channel load/store unit LSU $6_y$ is busy, the second address ADDR2 is retained in the X channel load/store unit $6_x$ ready for dispatch to the data memory 16 on the successive machine cycle.

Although a single instruction, the LDL2 instruction, has been described above, it will be appreciated that a whole class of instructions is possible. In the first place, the length of the object retrieved from memory can be set in the instruction as with the first class of instructions. That is, 8 bit objects (B), 16 bit objects (H), 32 bit objects (W), or 64 bit objects (L) can be retrieved from memory. In addition, there are store instructions with the same semantics as the load instructions in each case. Thus, the set of instructions are named LDB2, LDH2, LDW2, LDL2, STB2, STH2, STW2, STL2.

In addition, the packing of the index register $r_c$ can be set differently to allow different values to be added to the value $V_a$ in the base register $r_a$. Thus, the index register could provide the following index options $b_0,b_1$; $b_2,b_3$; $b_4,b_5$; $b_6,b_7$; $h_0,h_1$; $h_2,h_3$; $w_0,w_1$.

As a further modification, the base register itself can be treated as packed. That is, $V_a$ could comprise two packed objects W0,W1 which, when combined respectively with the packed objects in the index register $r_c$ generate the first and second addresses ADDR1, ADDR2. This increases the independence between the first and second addresses, because the base values can be set a long distance from one another in this way.

According to a further modification, each instruction can be caused to generate more than two addresses. For example, if the index register holds four packed objects ($b_0,b_1,b_2,b_3$, or $h_0,h_1,h_2,h_3$), then in principle four addresses can be generated by adding these objects respectively to the single base address $V_a$ or the packed base address objects W0,W1. This would require additional addition units in the load/store units.

Another, conventional, load instruction LDDL allows two long words to be loaded from two adjacent addresses in the data memory 16 into successive destination registers from a base address in a source register SOURCE with an offset given in a source register SOURCE+1.

The provision of the LDDL and LDL2 instructions combined with the flexibility of cooperation of the load/store units make the computer system described herein particularly useful in an MPEG environment.

Figure 6:
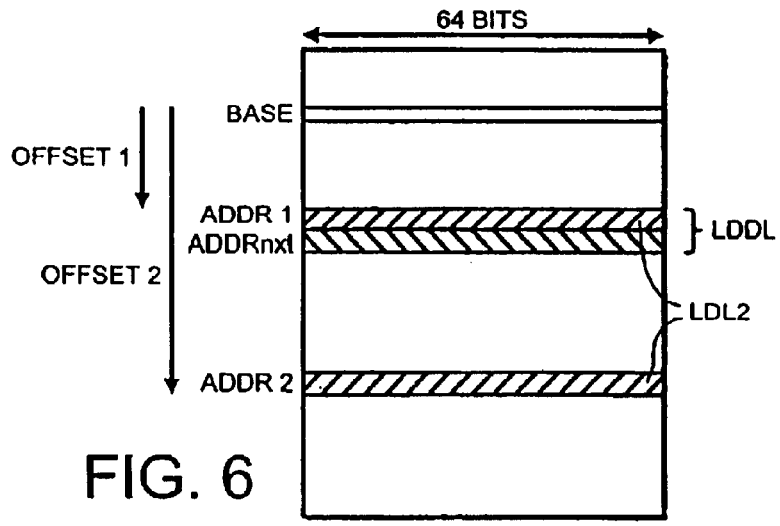
FIG. 6 is a diagram of a 64 bit wide memory space.

FIG. 6 is a schematic diagram of a 64 bit wide memory showing by way of example the effect of the LDDL and LDL2 instructions. That is, the LDDL instruction withdraws operands from two adjacent addresses, ADDR1 and ADDRnxt while the LDL2 instruction recalls data from two wholly independent addresses, ADDR1 and ADDR2. As has already been described, the addresses are determined from a base address and respective offsets held in a register. In each instruction, the base address is held in a first source register. For the LDDL instruction, the offset giving ADDR1 is held in a subsequent source register and the next address ADDRnxt is generated automatically. The generation of the next address depends on the memory width and semantics.

Figure 7:
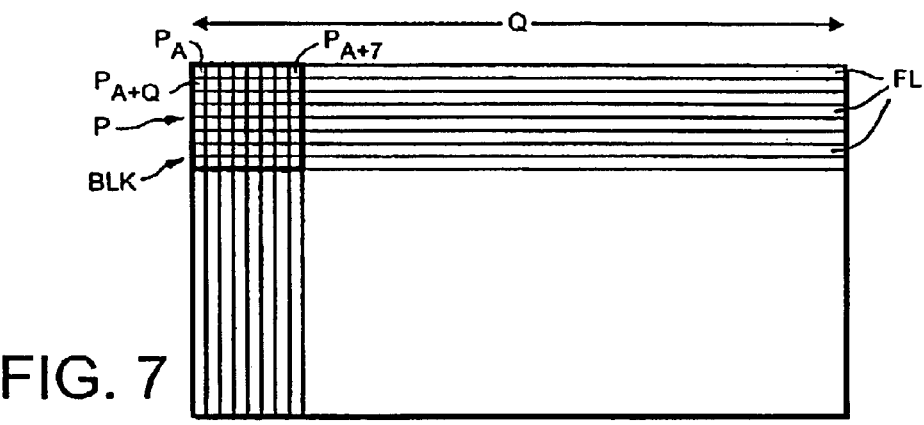
FIG. 7 illustrates frame data.
Figure 8:
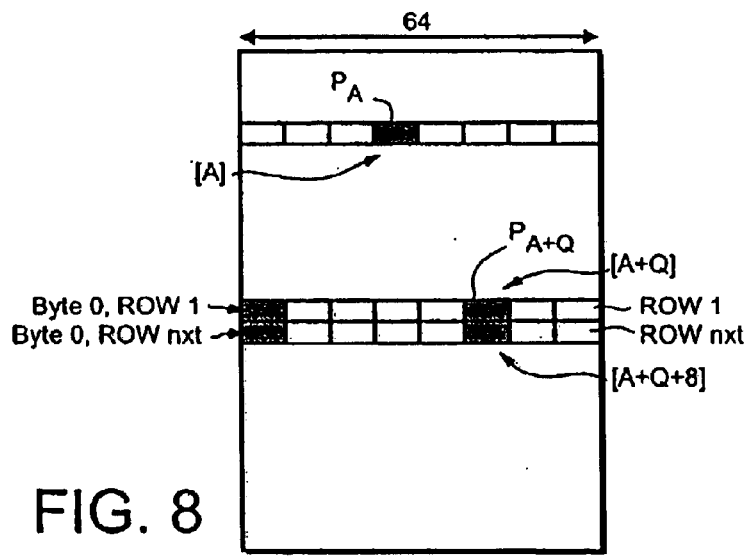
FIG. 8 illustrates frame data held in a 64 bit wide memory space.

Reference will now be made to FIGS. 7 and 8 to describe the particular usefulness of the LDDL and LDL2 instructions in an MPEG environment. FIG. 7 illustrates frame data which comprises a number of frame lines FL each containing a plurality of pixels P. Q denotes the number of pixels per line, for example 720. Typically, data processing is carried out on individual blocks within the frame, of which an 8×8 block is denoted BLK in FIG. 5. The top row of the block has pixels $P_A$ to $P_{A+7}$, the next row $P_{A+Q}$ to $P_{A+Q+7}$, etc. FIG. 8 illustrates how frame data of the type illustrated in FIG. 7 might be held in a 64 bit memory. Each pixel is represented by a single byte, and consequently 8 bytes (representing 8 pixels P) can be held in each addressable row of memory having a length of 64 bits. The memory is byte addressable, that is individual bytes can be addressed within the memory. However, each time a memory access is made by the LDL2 instruction, two 64 bit rows are retrieved. Consider for example that address [A] denotes the shaded byte in FIG. 6 and represents the address of the first pixel $P_A$ in the block of FIG. 5. Consider that we are trying to access the pixels $P_{A+Q}$ to $P_{A+Q+7}$, i.e. the second line of the 8×8 block BLK. The first pixel $P_{A+Q}$ of that frame line is held at address [A+Q]. To access the row which contains the byte at address [A+Q] (denoted Row1 in FIG. 8) a logical operation A+Q AND NOT 7 locates the first byte in Row1 (denoted by BYTE0, Row1) thus allowing that 64 bit object to be accessed by one word w0 in the packed index register $r_c$. The second word w1 in the index register $r_a$ of the LDL2 instruction row to be simultaneously accessed and processed. Alternatively (although not strictly necessary for 8×8 blocks) an LDDL instruction could have been used to generate the first address and the address of the subsequent row. The address of the subsequent row, Rownxt can easily be generated by the logical operation A+Q+8 AND NOT 7 which locates the first byte of the next row, labelled BYTE0, Rownxt and allows that object to be accessed. In this way the sequence of bytes representing the pixels $P_{A+Q}$ to $P_{A+Q+7}$ are accessed from the memory by the successive generation of two consecutive addresses.

The LDDL instruction is particularly useful for 16×16 blocks of pixels because it allows a complete line of 16 pixels (bytes) to be loaded from one instruction.

What is claimed is:

1. A memory access system comprising:
   a register holding at least two packed objects for use in identifying respective memory addresses;
   address generating circuitry for generating at least first and second memory addresses from said at least two packed objects;
   a first memory access unit that accesses a memory using said first and second addresses; and
   a second memory access unit operable to access said memory;
   wherein when said second memory access unit is inactive, said second address is issued to said second memory access unit to allow simultaneous memory accesses to be made by the first and second memory access units.

2. The memory access system according to claim 1, wherein the second memory address is not related to the first memory address.

3. The memory access system according to claim 1, wherein the register is an index register and wherein said at least two packed objects are offset objects for combining with a base value held in a second register to generate said first and second addresses.

4. The memory access system according to claim 3, wherein the base value comprises two packed objects representing two base addresses which are combined respectively with the packed offset objects in the index register to generate said first and second addresses.

5. The memory access system according to claim 3, wherein the address generating circuitry comprises first and second addition circuits for respectively adding the packed objects in the first register with the contents of the second register to generate said first and second addresses.

6. The memory access system according to claim 1, wherein said at least two packed objects represent respective base addresses, which identify respective memory addresses when combined with an offset in a second register.

7. The memory access system according to claim 1, wherein the register holds four offset objects, two of which are selected by the address generating circuitry for generating said first and second addresses.

8. The memory access system according to claim 1, wherein the register holds four offset objects for use in respectively identifying four memory addresses.

9. The memory access system according to claim 1, wherein the register holds eight offset objects, a number of which are selected for use in generating a corresponding number of memory addresses.

10. The memory access system according to claim 1, further comprising:
    a second register, the first and second registers having the same predetermined bit capacity and being capable of holding one or more objects depending on the bit length of the object.

11. A method of generating addresses for accessing a data memory, comprising:
    receiving a base value representing a base address;
    receiving an index value;
    wherein at least one of the base value and the index value include at least two packed objects;
    combining the base value and the index value to generate first and second addresses;
    providing the first address to a first memory access unit that accesses a memory using said first address; and
    providing the second address to a second memory access unit when said second memory access unit is inactive,
    wherein said first and second memory access units simultaneously access said memory using said first and second addresses.

12. The method according to claim 11, wherein the second memory address is not related to the first memory address.

13. The method according to claim 11, further comprising identifying locations of the base value and the index value from a single computer instruction.

14. The method according to claim 11, wherein the said at least two packed objects are offset objects for combining with the base value.

15. The method according to claim 14, wherein the base value comprises two packed objects representing two base addresses which are combined respectively with the offset objects to generate said first and second addresses.

16. The method according to claim 11, wherein said at least two packed objects represent respective base addresses, which identify respective memory addresses when combined with an the index value.

* * * * *